Dec. 30, 1958  F. C. HALEY  2,866,499
APPARATUS AND PROCESSES FOR CONCENTRATING AND EVAPORATING LIQUIDS
Filed Aug. 1, 1955
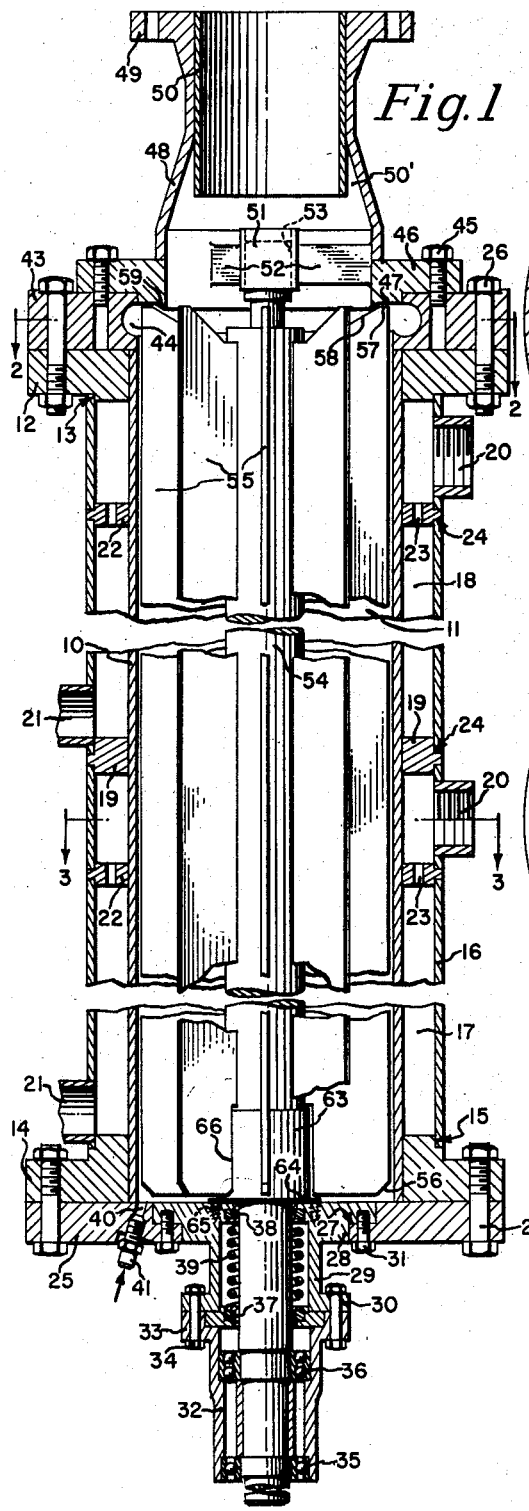
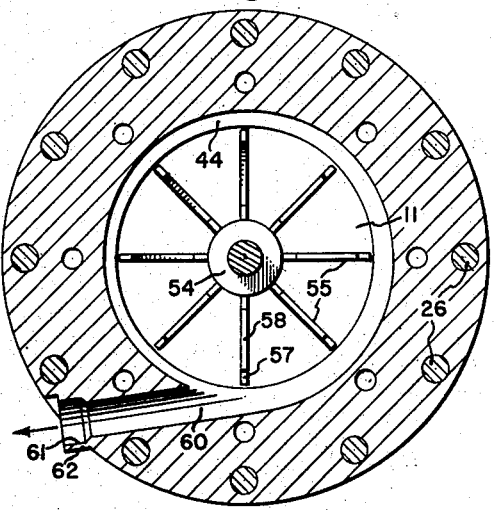
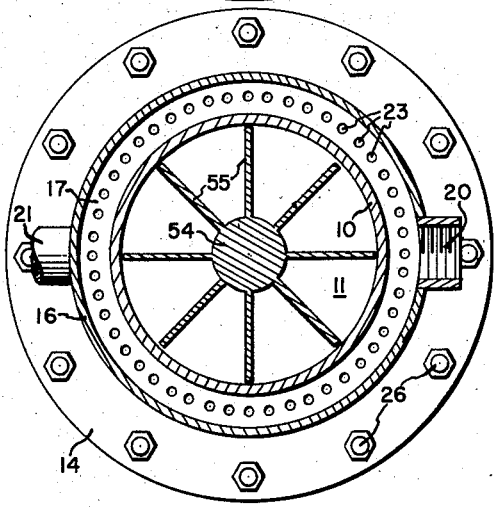
INVENTOR
FLOYD C. HALEY
BY *Lynn Barratt Morris*
ATTORNEY United States Patent Office 2,866,499
Patented Dec. 30, 1958

2,866,499

APPARATUS AND PROCESSES FOR CONCENTRATING AND EVAPORATING LIQUIDS

Floyd C. Haley, New Monmouth, N. J., assignor to E. I. du Pont de Nemours and Company, Wilmington, Del., a corporation of Delaware Application August 1, 1955, Serial No. 525,570

12 Claims. (Cl. 159—6)

This invention relates to an apparatus and processes for treating a climbing film and more particularly to an apparatus and processes for the heat-exchange treatment of a climbing film. Still more particularly it relates to an apparatus and processes for heat-treating an annular climbing film directing its discharge from film flow to full volume at an outlet, and separately removing the vapor axially while controlling the ratio of liquid and vapor removed. In an important aspect the invention relates to a climbing film evaporator and processes of evaporation.

Various types of liquid treating apparatus including evaporators in which a thin cylindrical film of liquid is heated during its passage from an inlet to an outlet are known. They include both the climbing film and falling film types. They differ widely in construction and some are expensive to construct and difficult to operate especially with liquid materials that are extremely sensitive to heat.

An object of this invention is to provide an improved climbing film apparatus of general utility for the heat-exchange treatment of fluids. Another object is to provide such an apparatus which is of simple construction and is dependable in operation. Yet another object is to provide such an apparatus in which a liquid is heated and continuously and effectively separated from vapor. A specific object is to provide an improved continuous process of concentrating liquids containing solids in which a concentrated liquid is removed under pressure and vapor is separately removed. A still further object is to provide a process and apparatus for concentrating aqueous dispersions of light-sensitive silver halide in a water-permeable colloid. A still further object is to provide such a process which can be carefully controlled. Still further objects will be apparent from the following description of the invention.

The novel process of this invention, which is useful for the evaporation and concentration of liquids in its broader aspects comprises introducing under pressure at least one liquid into the bottom of a heat-exchange zone, centrifugally shaping the liquid into the form of an annular film, upwardly directing said film barring further upward movement of the film at a point a substantial distance above the bottom of said zone while directing its discharge from film flow to full volume at a lateral outlet and upwardly and axially removing any evolved vapor. The ratio of liquid and vapor removed is controlled during the process. The liquid may, of course, contain solid material if desired, a gas or vapor may be introduced into the zone with the liquid or liquids.

The processes will be more readily understood from a description of the apparatus of the invention. Referring now to the accompanying drawings, which form a part of the present specification and in which like reference numerals indicate like parts in the several views:

Fig. 1 is a vertical sectional view, with parts in elevation, of the separator of the invention, Fig. 2 is a horizontal sectional view taken along the line 2—2 of Fig. 1, and Fig. 3 is a horizontal sectional view taken along the line 3—3 of Fig. 1.

Referring to the drawings and particularly to Fig. 1, the climbing film apparatus which is useful for the evaporation and concentration of liquids consists of a cylindrical metal tube 10, the inner surface of which constitutes the confining wall of the centrifugal chamber 11. The upper end of the tube is provided with a collar plate 12 having a shoulder 13 on its lower surface and the lower end is provided with a similar collar plate 14 having a shoulder 15 in its upper surface. Surrounding tube 10 and interfitting with said shoulders is a cylindrical sleeve 16. The space between the sleeve and the tube forms a jacket for the circulation of a heat-exchange fluid. For convenience, this jacket is divided into zones 17 and 18 by means of imperforate ring 19. Each zone is provided with an inlet 20 and an outlet 21. While two zones only are shown in the drawing, if desired, additional dividing walls and inlets and outlets can be added so that a plurality of separately controllable heat-exchange zones will be present. In order to give further strength to the apparatus, annular rings 22 are provided at spaced intervals. These rings are provided with a plurality of openings 23 so that the heat-exchange fluid will flow through them. The rings can be bolted, welded or otherwise fixed to the outer wall of the tube or inner wall of sleeve 16. As shown, the sleeve is in the form of separate sections which interfit with annular shoulders 24 on both types of rings. Instead of holes as shown, the rings 22 can be provided with lengthwise grooves at their outer or inner edges, or they can be reticulated.

There is attached to the lower collar plate 14 a flange 25 which is secured to said collar by means of bolts 26. The flange has an opening in the center and an annular shoulder 27 which is adapted to receive an interfitting closure plate 28 having a depending boss 29 and a flanged end 30. The plate is secured to flange 25 by means of bolts 31. A bearing housing 32 having a flanged end 33 is attached to the flanged end of the boss by means of bolts 34. Within the bearing housing are two spaced antifriction bearings 35 (lower) and 36 (upper).

The center of the ball bearing housing is recessed at its upper end to receive a sealing ring 37. The upper inner end of closure plate 28 is also recessed to receive a sealing ring 38. Between the two sealing rings there is disposed a helical spring 39 which holds the sealing rings in proper position.

The lower flange is provided with a passage 40 for the introduction into chamber 11 of a liquid composition to be processed in chamber 11. A suitable fitting 41 is threadably engaged with the passage and this fitting can be connected to a suitable pipe (not shown) connected to a source of supply of the liquid material to be treated.

There is attached to the top collar 12 an upper flange 43 having a spiral shaped channel in its inner cylindrical shaped side wall. This top flange is secured to the collar in the same manner as the lower flange, i. e., by means of bolts 26. Attached to flange 43 by means of bolts 45 is a closure plate 46 having an up-standing neck 48 which is provided wtih a flange 49 at its upper end. The neck has a restricted upper end which contains an inner cylindrical sleeve 50, which provides a circumferential conical recess 50′ between the inner surface of the neck and the outer surface of the sleeve. In the lower inner part of the neck adjacent the bottom of the closure plate there is a bearing 51 which is attached to the closure plate by means of radial arms 52. The hub and radial arms constitute a spider and the hub has an inner bearing surface 53 that is adapted to receive the upper end of rotor shaft 54. This shaft is provided with a plurality of imperforate blades 55 which are secured to the rotor shaft by any suitable means, e. g., welding or secured in radial recesses by means of bolts or set screws. The lower end of each blade has chamferred corners 56. The upper end of each blade has a horizontal portion 57 extending from its outer edge inwardly a short distance and a downwardly slanting edge 58. The bottom surface of closure plate 46 has a level portion interfitting with the horizontal end of the blades and depending slanting lip 59 which interfits with the slanting edge 58 of the rotor blades.

A tangential outlet passage 60 in flange 43 communicates with the spiral collecting channel 44 and with a suitable pipe 61 in its outer flared end 62. This pipe is connected with a suitable receiver or other apparatus to which the concentrated fluid is to be delivered.

In order to insure that no liquid will pass through the upper bearing seal into the housing, a sleeve 63 having a radial flange 64 surrounds the rotor shaft. It is fixed to the upper surface of closure plate 28 by means of screws 65. The rotor blades have slots 66 into which the sleeve fits.

While only one inlet 40 for the introduction of a liquid to be treated is shown in the drawing, if desired, two or more inlets can be used. In the case where the apparatus is used for a chemical reaction, a reactant liquid can be introduced through one inlet and a separate liquid or gaseous reactant through another. Similarly, a liquid or fluid catalyst (dispersion of catalyst particles in a liquid) can be introduced through a separate inlet.

The operation of the apparatus just described will now be explained with reference to the concentration of a volatile liquid which contains solid material. An aqueous solution containing 10% by weight of gelatin is fed under pressure at a temperature of 95° F. and a viscosity essentially that of water through passage 40 into the bottom of chamber 11 at the outer circumferential edge while the rotor is revolving at 1400 to 2000 R. P. M., being driven by a suitable motor (not shown) attached to the rotor shaft 54. A current of steam is passed into inlets 20 and through outlets 21. The temperature of the gelatin solution is held at 128° F. by controlling the vacuum applied at the vapor outlet. The gelatin solution rises in the form of a thin film between the outer edges of the rotor blade and the inner wall of the tube up to the spiral collecting channel 44 where it is directed in a spiral stream through outlet 60 and is recovered in a more concentrated form about 42% by weight of gelatin (viscosity approximately 10,000 centipoises). The vapors are removed through the outlet in the upper part of the device through cylindrical sleeve 50.

As the cylindrical film of fluid rises, it becomes more and more concentrated and since closure plate 46 forms a barrier against any further rise, it is forced into the spiral collecting channel where it flows under pressure in a spiral path to the outlet passage 60. The overhang and depending lip of closure plate 46 insure a smooth continuous flow of liquid from the entrance passage 40 through the outlet passage 60. Substantially no liquid material rises over the barrier and only droplets entrained in the vapor will collect in the conical circumferential recess 50' where it will collect and return along the side walls back into the upper end of the chamber and be forced into the spiral collecting channel.

A dispersion of silver halide in aqueous gelatin can be concentrated in like manner. For instance, a dispersion containing about 10% by weight of solids (viscosity approximately that of water) was introduced through passage 40 at a temperature of about 95° F. and a feed rate of approximately 360 grams per minute. The volatile ingredients were evaporated at a temperature of 120° F. and pressure of 26.7 inches of mercury below atmospheric pressure. The concentrate was removed at a rate of about 74 grams per minute at a temperature of 120° F. and a viscosity of approximately 7,000 centipoises (the solution containing approximately 51.5% solids). Water was removed at the rate of about 296 grams per minute.

In another exemplary procedure a silver halide dispersion in aqueous gelatin containing 17% solids and having a viscosity essentially that of water was fed to the evaporator at a rate of approximately 445 grams per minute and the concentrate removed at the rate of 145 grams per minute. The emulsion was fed at 96° F., evaporated at 103° F., and the concentrate removed at 103° F. Chemical analysis showed the concentrate to be 55.5% solids, and at a temperature of 103° F. it had a viscosity approximately 25,000 centipoises.

In the procedures described in the foregoing paragraphs, chamber 11 had an internal diameter about 3 inches and a height of about 1.5 feet giving an evaporative area of approximately 1.1 square feet. While steam was used for the heat-exchange fluid, various other materials can be used, e. g., chlorinated biphenyl, diphenyl oxide, mineral oils of high flash point, etc.

The apparatus of this invention can be operated under reduced pressure or a vacuum by applying a source of reduced pressure at the vapor outlet. The absolute pressure in the apparatus is adjusted and maintained sufficiently low that the boiling point of the liquid being concentrated is held below the temperature at which the material would be injured. Mere high pressure at the inlet is, of course, inadequate alone to accomplish this effect and resulting control of temperature. For materials which do not require low-temperature operation, the apparatus can be operated either under pressure or under vacuum.

Conventional vacuum concentrating apparatus require that the material outlet have an exit pump or utilize a receiving vessel under vacuum, which may be applied from the same or a different vacuum source from that applied at the vapor outlet. In the apparatus of this invention, even when the vapor outlet has an applied vacuum, the combination of the spinning rotor action together with the novel upper dam result in sufficient centrifugal force to cause an outward pressure and flow of material at the concentrate outlet. This result is unique in vacuum evaporation apparatus. Thus, the apparatus and processes of this invention permit the use of reduced pressures or a vacuum and reduced temperatures in a continuous manner in the treatment of liquid materials by having the concentrate outlet at atmospheric pressure. The concentrate can be fed from the outlet to any other operation without the necessity of breaking vacuum with resulting time loss and possible product contamination. It is, of course, still possible and in many cases desirable to operate the proposed equipment with a vacuum applied at the concentrate outlet.

The various parts of the apparatus are preferably made of metal so that it will have the requisite strength and durability. The inner tube 10 and other parts which come into contact with the liquid to be concentrated are preferably composed of a corrosion-resistant metal, e. g., stainless steel. The rotor blades and shaft are preferably made of the same type of material and the surfaces should be smooth or highly polished. The inner surfaces, of course, can be electroplated with various materials capable of taking a smooth, high polish, e. g., nickel and/or chromium.

The outer parts of the apparatus can, of course, be made of any of the usual materials of which climbing or falling film evaporators are made. The flanges and closure plate can be made of the usual alloy steels, titanium or in some cases, cast iron.

While the apparatus shown in the drawing has a fluid heat-exchange jacket, heat can be applied in other manners. For example, electrical heaters, either of the resistance or induction type, can be used. Thus, electrical resistors may be placed around or imbedded in the tube 10.

An important feature of the present invention is the spiral shaped collecting channel which directs the concentrated liquid to the outlet where it flows under pressure. Being spiral shaped or involute, it will be seen that as each increment of liquid rises into the collecting channel, the volume will build up in the collecting channel from a minimum at a starting radial point to a maximum at the end radial point (about 330° from the starting point). Continuous control of the rising annular film to convert it into a tangential solid stream is attained. This is accomplished by continuously controlling discharge of the fluid, by incrementally deannulating the rising annular film from the place where upward movement is barred, from annular flow through incrementally increasing solid stream flow to a solid tangential stream of full volume.

The apparatus is also useful for the concentration of many diverse types of liquids containing solids. Thus, it can be used for the concentration of a dispersion of silver halide in other natural or synthetic water-permeable colloids, e. g., polyvinyl alcohols, polyvinyl acetals, including the color-forming acetals of U. S. Patent 2,397,864.

The apparatus is also useful for concentrating aqueous dispersions of the haloprenes, e. g., chloroprene, aqueous solutions of the diamine salts used in the production of nylon, e. g., hexamethylenediammonium adipate, etc.

The apparatus is also useful for concentrating aqueous dispersions of colloidal silver, pigments and finely divided magnetizable particles, e. g., iron, cobalt and nickel particles or the magnetizable oxides which are used in making magnetic sound tape, etc.

The apparatus of this invention has the advantages of being simple in construction and dependable in operation. The apparatus will run continuously over long periods of time with a minimum of observation and control. In fact, instruments can be used to control the temperature, rates of fluid entry and delivery, etc. A further advantage of the apparatus is that it can be readily disassembled by simply removing lower bolts 31 and upper bolts 45 and withdrawing the rotor shaft and blades and bearing assembly through the upper end.

An additional advantage of the apparatus is that by connecting a motor directly to the rotor shaft no radial load is imposed on the rotor. This means that the clearance between the wall and the rotor blades is maintained by the film and results in a more uniform cross-section.

Still other advantages will be apparent from the above description.

The invention claimed is:

1. The process of evaporating and concentrating a liquid which comprises introducing under pressure into the bottom of a vertical heat-exchange zone at least one liquid, centrifugally shaping the liquid into the form of an annular rising film, barring further upward movement of the film near a lateral liquid discharge outlet while continuously controlling its discharge by incrementally deannulating said film at the point where said upper movement is barred, from annular flow, through an incrementally increasing flow to a solid tangential stream at full volume, and simultaneously upwardly and axially removing any evolved vapor.

2. A process as set forth in claim 1 wherein said liquid is a dispersion of silver halide in an aqueous solution of a water-permeable colloid.

3. A process as set forth in claim 1 wherein said liquid is an aqueous dispersion of a water-permeable colloid.

4. A process as set forth in claim 3 wherein said colloid is gelatin.

5. An apparatus for the evaporation and concentration of liquids, comprising a vertical chamber having a cylindrical wall, means for passing a heat-exchange fluid into contact with the outer surface of said wall, a bottom closure member for said chamber having an axial opening and bearing means therein for a rotor shaft, an upper closure member for said chamber having an axial vapor outlet and associated bearing means for said shaft, an imperforate rotor in said chamber having a plurality of vertical imperforate circumferentially-spaced vanes on the shaft of said rotor, the outer edges of which are in close proximity to the cylindrical wall and the ends of which are near the upper and lower closure members, said upper closure member having a dam portion extending laterally from said cylindrical wall in close proximity to and in overlapping relationship with the ends of said vanes and a spiral-shaped collecting channel immediately below said dam extending substantially around said chamber and cooperating therewith and with the upper vertical outer edges of said vanes to force a treated liquid to a tangential outlet communicating with said channel and means for introducing at least one liquid into the lower part of said chamber.

6. An apparatus as set forth in claim 5 wherein the upper ends of said vanes extend horizontally from their outer edges for a short distance and then slant downwardly toward said shaft and the outer lower ends of said vanes are chamfered radially.

7. An apparatus for the evaporation and concentration of liquids, comprising a vertical chamber having a cylindrical wall, means for passing a heat-exchange fluid into contact with the outer surface of said wall, a bottom closure member for said chamber having an axial opening for a rotor shaft, said closure member having attached thereto a seal and a housing containing bearings for said shaft, an upper closure member for said chamber having an axial vapor outlet and a bearing for the upper end of said shaft, a rotor shaft rotatably journaled in bearings, a plurality of imperforate circumferentially-spaced vanes on said shaft, the outer edges of said vanes being in close proximity to the cylindrical wall and the ends of said vanes being near the upper and lower closure members, said upper closure member having a dam portion extending laterally from said cylindrical wall in close proximity to and in overlapping relationship with the ends of said vanes and a spiral-shaped collecting channel immediately below said dam extending substantially around said chamber and cooperating therewith and with the upper vertical outer edges of said vanes to direct a treated liquid to a tangential outlet communicating with said channel and at least one passage for the introduction of liquid material into the chamber.

8. An apparatus as set forth in claim 7 wherein said passage is in the bottom closure member.

9. An apparatus as set forth in claim 7 wherein said means for passing a heat-exchange fluid comprises at least one jacket provided with an inlet and outlet.

10. An apparatus as set forth in claim 9 wherein the vapor outlet contains a vertical sleeve providing an annular conically-shaped zone for the collection of entrained liquid particles.

11. In an apparatus for the evaporation and concentration of liquids having a vertical cylindrical chamber provided with means for passing a heat exchange fluid into contact with the outer surface of the walls of said chamber wherein a climbing liquid film can be concentrated and separated from evolved vapors, the combination with an upper closure member for said chamber of an inwardly extending dam portion and of a spiral-shaped collecting passage immediately below and in coacting relationship with said dam portion and extending substantially around the upper end of said chamber for directing liquid to a tangential outlet.

12. In an apparatus for the evaporation and concentration of liquids having a vertical cylindrical chamber provided with means for passing a heat exchange fluid into contact with the outer surface of the walls of said chamber and an imperforate vertical rotor having integral imperforate vertical vanes wherein a climbing liquid film is separated from evolved vapor, the combination, with a closure member therefor having an axial vapor outlet and an annular dam for said film, of an annular ring having in its inner wall a spiral-shaped collecting passage extending around said chamber which increases incrementally to full volume at a tangential outlet.

References Cited in the file of this patent

UNITED STATES PATENTS

| | | |
|---|---|---|
| 548,986 | Hewitt | Oct. 29, 1895 |
| 868,275 | Kaiser | Oct. 15, 1907 |
| 1,186,175 | Feldmeier | June 6, 1916 |
| 1,443,714 | Merrell | Jan. 30, 1923 |
| 1,732,805 | Yarmett | Oct. 22, 1924 |
| 2,256,356 | Russel et al. | Sept. 16, 1941 |
| 2,546,381 | Zahm | Mar. 27, 1951 |
| 2,581,081 | De Vout | Jan. 1, 1952 |

FOREIGN PATENTS

| | | |
|---|---|---|
| 3,782 | Great Britain | 1873 |

OTHER REFERENCES

Handbook of Physics and Chemistry, 36th edition, 1954–5, published by Chemical Rubber Publishing Co., Cleveland, Ohio, page 2008.